US 12,099,343 B2

(12) United States Patent
Kaehler (10) Patent No.: US 12,099,343 B2
(45) Date of Patent: Sep. 24, 2024

(54) SCHEDULER FOR ROBOT FLEETS (71) Applicant: SANCTUARY COGNITIVE SYSTEMS CORPORATION, Vancouver (CA)

(72) Inventor: Adrian Kaehler, Campbell, CA (US)

(73) Assignee: Sanctuary Cognitive Systems Corporation, Vancouver (CA)

( * ) Notice: Subject to any disclaimer, the term of this patent is extended or adjusted under 35 U.S.C. 154(b) by 341 days.

(21) Appl. No.: 17/711,997

(22) Filed: Apr. 1, 2022

(65) Prior Publication Data
US 2022/0317661 A1 Oct. 6, 2022

Related U.S. Application Data (60) Provisional application No. 63/169,714, filed on Apr. 1, 2021.

(51) Int. Cl.
*G05B 19/4155* (2006.01)
*G05B 23/02* (2006.01)
*G05B 19/418* (2006.01)

(52) U.S. Cl.
CPC ..... *G05B 19/4155* (2013.01); *G05B 23/0283* (2013.01); *G05B 19/418* (2013.01); *G05B 2219/50391* (2013.01)

(58) Field of Classification Search
CPC ............ G05B 19/4155; G05B 23/0283; G05B 19/418; G05B 2219/50391
See application file for complete search history.

(56) References Cited

U.S. PATENT DOCUMENTS

| 2008/0101807 A1* | 5/2008 | Burry ................. G03G 15/0216 399/50 |
| 2015/0073594 A1* | 3/2015 | Trujillo ..................... B25J 9/162 901/1 |
| 2015/0185729 A1* | 7/2015 | Kuffner, Jr. ............ B25J 9/0084 700/248 |
| 2015/0213417 A1* | 7/2015 | Kuffner, Jr. ............ G06Q 10/20 705/305 |

(Continued)

FOREIGN PATENT DOCUMENTS

KR 10-2018-0023586 A 3/2018
WO 2020012982 A1 1/2020

OTHER PUBLICATIONS

International search report, PCT/US2022/023712, Jul. 14, 2022.
(Continued)

*Primary Examiner* — Sohana Tanju Khayer
(74) *Attorney, Agent, or Firm* — Thomas Mahon; Adenike Adebiyi (57) ABSTRACT

Provided is a process, including: obtaining, with a computer system, a set of tasks to be performed by a fleet of robots; obtaining, with the computer system, for each task in the set of tasks, a respective plurality of duty cycles, each corresponding to an amount of usage of a respective actuator of a robot among the fleet of robots upon performing the respective task; accessing, with the computer system, for each robot in the fleet of robots, a current wear-state vector having dimensions corresponding to cumulative wear on actuators of the respective robots; and based on the current wear-state vectors and the duty cycles of the tasks, with the computer system, assigning the tasks to the robots in the fleet of robots.

20 Claims, 5 Drawing Sheets (56) References Cited

U.S. PATENT DOCUMENTS

| | | | |
|---|---|---|---|
| 2017/0050321 A1* | 2/2017 | Look | G06Q 10/06398 |
| 2021/0053219 A1* | 2/2021 | Nishimura | B25J 9/1633 |
| 2021/0065556 A1* | 3/2021 | Aijaz | G05D 1/0295 |
| 2021/0081752 A1 | 3/2021 | Chao et al. | |
| 2021/0252698 A1 | 8/2021 | Paxton et al. | |
| 2021/0253128 A1 | 8/2021 | Nister et al. | |
| 2021/0357782 A1 | 11/2021 | Graves et al. | |
| 2021/0387330 A1 | 12/2021 | Mavrin et al. | |
| 2022/0016766 A1 | 1/2022 | Humayun et al. | |
| 2022/0035973 A1 | 2/2022 | Liebman et al. | |
| 2022/0051138 A1 | 2/2022 | Stoll et al. | |
| 2022/0084272 A1 | 3/2022 | Wang et al. | |
| 2022/0101627 A1 | 3/2022 | Pappas et al. | |
| 2023/0132449 A1* | 5/2023 | Cella | B29C 64/386 705/7.13 |

OTHER PUBLICATIONS

Written Opinion of the International Searching Authority, PCT/US2022/023712, Jul. 14, 2022.

Internet Archive of "Transfer Learning," Wikipedia, https://web.archive.org/web/20210331015532/https://en.wikipedia.org/wiki/Transfer_learning, Mar. 31, 2021, pp. 1-5.

* cited by examiner

SCHEDULER FOR ROBOT FLEETS

CROSS-REFERENCE TO RELATED APPLICATIONS

This patent claims the benefit of U.S. Provisional Patent Application 63/169,714 filed Apr. 1, 2021, titled "Scheduler for Robot Fleets." The entire content of each aforementioned patent filing is hereby incorporated by reference.

BACKGROUND

This disclosure relates generally to dynamic mechanical systems and, more specifically, to a scheduler for dynamic mechanical systems.

Dynamic mechanical systems are often controlled with computational processes. Examples include robots, industrial processes, life support systems, and medical devices. Generally, such a process takes input from sensors indicative of state of the dynamic mechanical system and its environment and determines outputs that serve to control various types of actuators within the dynamic mechanical system, thereby changing the state of the system and potentially its environment.

SUMMARY

The following is a non-exhaustive listing of some aspects of the present techniques. These and other aspects are described in the following disclosure.

Some aspects include a system including: obtaining a set of tasks to be performed by a fleet of robots; obtaining, for each task in the set of tasks, a respective plurality of duty cycles, each corresponding to an amount of usage of a respective actuator of a robot among the fleet of robots upon performing the respective task; accessing, for each robot in the fleet of robots, a current wear-state vector having dimensions corresponding to cumulative wear on actuators of the respective robots; and based on the current wear-state vectors and the duty cycles of the tasks, with a computer system, assigning the tasks to the robots in the fleet of robots with a vector packing algorithm.

Some aspects include a tangible non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

To easily identify the discussion of any particular element or act, the most significant digit or digits in a reference number refer to the figure number in which that element is first introduced.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION

To mitigate the problems described herein, the inventors had to both invent solutions and, in some cases just as importantly, recognize problems overlooked (or not yet foreseen) by others in the fields of artificial intelligence and robotics. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Managing fleets of such dynamic mechanical systems is expected to present particularly complex scheduling challenges. For example, existing schedulers for things like data centers are generally not well suited for use cases like those presented by robots. Unlike servers or virtual machines, which largely do not wear when used, robots generally experience wear that varies according to the task performed. Existing scheduling approaches generally do not account for variation in wear on robots (or other dynamic mechanical systems) imposed by a diverse set of tasks, leading to suboptimal use of robots and premature maintenance.

As such, optimizing (at term which does not require an absolute global maximum or minimum be reached) workload allocation to robots is expected to be challenging. Multi-degree-of-freedom robots are generally driven by some number of separate actuators, referred to here as N (e.g., more than 2, 10, 20, or 60). For any given workload, a robot may use some subset of these N actuators, referred to here as k, and the duty cycle for each actuator may vary in the task, referred to here as $d\_k$. In general, it is expected that $d\_k$ will tend to be inhomogeneously distributed among a set of tasks. Further, the values $d\_k$ for a particular task T will often be different. Given m robots (which may be identical or different, and may be more than 4, 20, or 200) doing m tasks (which, in general may be different, but repetition is also contemplated, and may be more than 3, 5, 20, or 200), the wear on the actuators for each robot is expected to be, in general, uneven, and each robot is expected to fail when the most highly used actuator has exhausted its lifetime.

Some embodiments implement a workload scheduler that rotates (or otherwise reassigns tasks among) the individual robots through the m tasks at intervals such that, the usage time for the actuators on each robot is as close to equal as possible (both for the actuators on individual robots, and across all robots), or is within some target threshold of variation, e.g., within less than 1% variation, 10% variation, or 30% variation among the fleet of robots.

The scheduler, in some embodiments, executes on a remote or local server that manages a fleet of robots by assigning tasks to the robots. The scheduler, in some embodiments, implements a bin packing algorithm that operates in a relatively high-dimensional space (e.g., 4, 5, or 10, or 20 or more dimensions) corresponding to the number of degrees of freedom of a model of robot. In some cases, each dimension in this space corresponds to a degree of freedom of the model of robot. In some embodiments, instances of tasks occupy a hyperrectangle volume of the space, with each dimension thereof corresponding to $d\_k$ of the task. The volumes may be stacked in the volume as tasks are assigned, with each side of the hyperrectangle resting at a distance from the origin of a furthest side of a previous furthest extending (in the respective dimension) hyperrectangle. This objective may also be characterized as a "vector packing" problem. In some embodiments, the scheduler may optimize workload allocation among a fleet of robots to minimize the aggregate amount of empty space between such hyperrectangle volumes in instances of the spaces corresponding to the robots, until the hypercubes exceed a threshold distance where robot parts are expected to wear or need maintenance.

In some embodiments, the scheduler may implement a greedy optimization strategy, rather than seeking to implement a global optimum over the entire maintenance life cycle of the fleet. For example, some embodiments may determine the hyperrectangle volume of a given task to be allocated and then determine where stacking that hyperrectangle (in the manner described above, among higher dimensional spaces corresponding to the different robots) will leave the most margin in all dimensions, among all of the robotics in the fleet, before the maintenance threshold, or other wear envelope, is crossed in one of those spaces. In some cases, a plurality of tasks may be assigned with a collective optimization among those tasks, like between 2 and 5, between 5 and 20, or between 2 and 100 tasks.

In some embodiments, the scheduler operates without having access to which tasks will be assigned in the future in which sequence and is constrained to performing the tasks in the order assigned. In some cases, the scheduler implements online bin packing algorithms like Next-ft, First-fit, Best-fit, Worst-Fit, Alomost-Worst-Fit, Refined-First-Fit), Harmonic-k, Refined Harmonic, Modified Harmoic, Modified Harmonic 2, harmonic+1, or Harmonic++.

In some embodiments, the scheduler is free to reorder the tasks from among a set of known tasks to be performed. Such schedulers may implement offline bin packing algorithms like First-fit-decreasing, Modified-first-fit-decreasing, or Hoberg and Rothvoss.

In some cases, an approximate solution may be found by the scheduler to reduce computational complexity, e.g., the approaches described in Otoo et al, A $\Theta(n)$ Approximation Algorithm for 2-Dimensional Vector Packing, arXiv: 1103.0260v1 [cs.DS] 1 Mar. 2011, or by Khan in APPROXIMATION ALGORITHMS FOR MULTIDIMENSIONAL BIN PACKING, August 2015, PhD Thesis, School of Computer Science Georgia Institute of Technology, the contents of both of which are hereby incorporated by reference.

In some embodiments, the scheduler has access to a probability distribution of shapes of such hyperrectangles expected to be received in a workflow, and some embodiments may optimize workload allocation according to that distribution. In some cases, wear may be likelihood-weighted based on the likelihood of a correspond task later arising before maintenance. In some cases, a plurality of tasks and a plurality of robots in a fleet may correspond to a set of possible assignments of the tasks among the robots. In some cases, assignments may select among the set of possible assignments to arrive at assignments that tend to synchronize maintenance among robots in the fleet and reduce amounts of wear space unoccupied by the above described hyperrectangles. In some cases, this may be done by brute-force evaluation of such metrics for every possible assignment or in some cases (and it is expected for many commercially relevant use cases) brute force approaches may not be computationally feasible, in which case heuristics, greedy optimizations, and other approaches like those described above may be applied to determine an assignment without evaluating the amount of unoccupied wear space for every possible packing of the hypercubes.

Some embodiments may take into account the feasible number of times that one can rearrange the robots, or some embodiments may assign a cost with a cost function to various types of reassignments and optimize based on both that cost and a cost assigned to earlier-than-otherwise-optimal maintenance.

Some embodiments may schedule tasks for a fleet of robots like that described in U.S. patent application Ser. No. 16/918,999, filed 1 Jul. 2020, titled Artificial Intelligence-Actuated Robot, the contents of which are hereby incorporated by reference. Other types of robotics may also be controlled with the present techniques, which are expected to be particularly beneficial in unstructured and semi-structured environments, like those encountered by drones and self-driving vehicles.

Wear and tear on parts of dynamic mechanical systems can affect the number of tasks they execute. For example, a servo motor of a robot may have an estimated life cycle of two hundred thousand duty cycles. To maximize (or at least increase) the longevity and efficacy of the mechanical portions of a robot, some embodiments distribute a heterogenous workload across a fleet of robots (or other dynamic mechanical systems) to more evenly wear mechanical parts. A fleet of robots may include robots configured to perform one or more tasks, and in some cases, robots in the fleet may be of the same make and model of robot, or they may be specialized in some regards. The one or more tasks to be performed may be performed concurrently, serially, in the same place, or in diverse places. Additionally, each robot need not have the exact same specifications or configurations to be considered a robot of the fleet. A fleet of robots can include other machinery or tools that are shared as implements by robots among the fleet, and in some cases, tasks may be allocated to even load on these tools as well.

Figure 1:
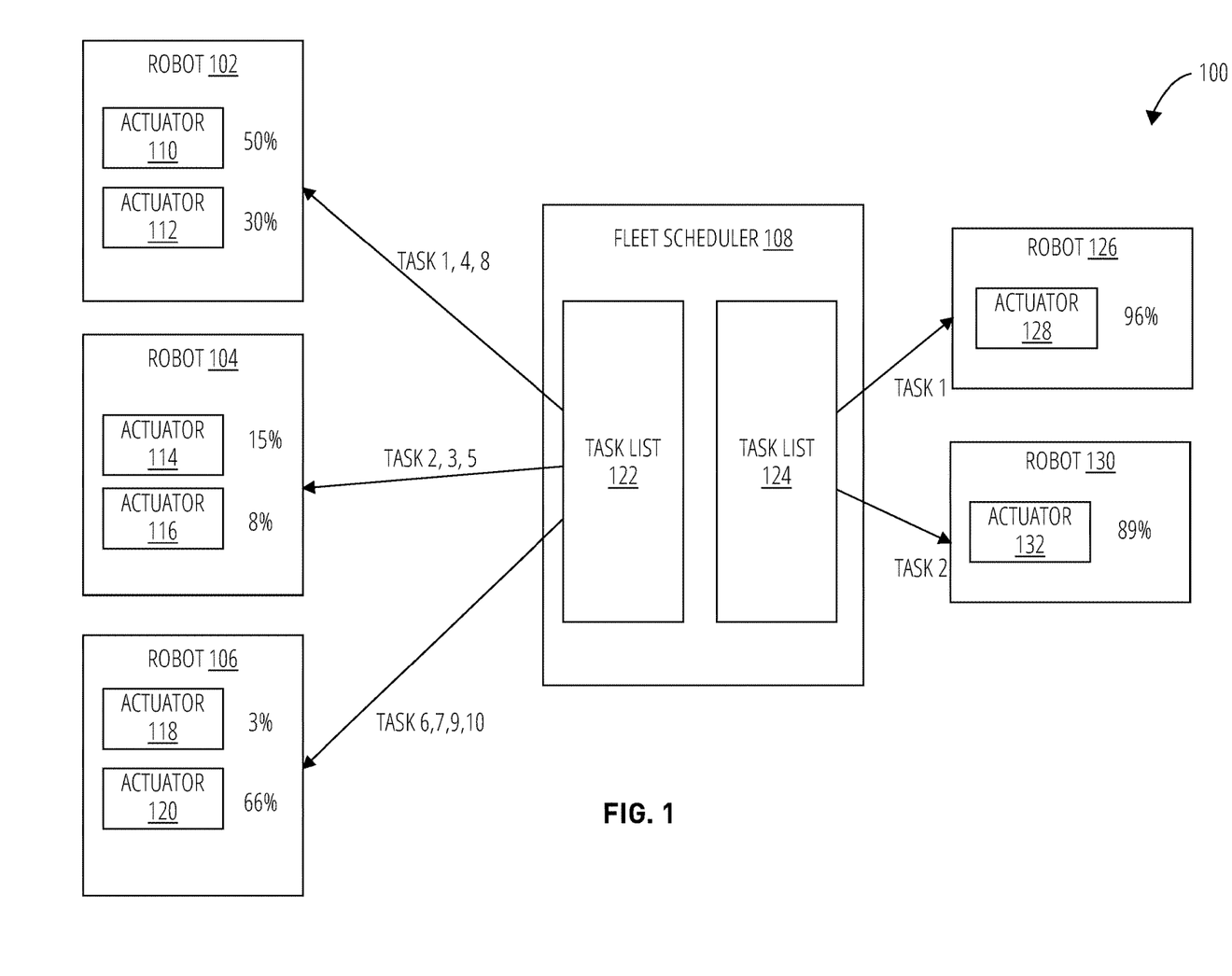
FIG. 1 illustrates an example robot fleet management system for assignment of tasks in accordance with some embodiments.

FIG. 1 illustrates an example robot fleet management system for assignment of tasks in accordance with some embodiments. Fleet system 100 includes one or more robots 102, 104, 106, 126, and 130 having actuators 110, 112, 114, 116, 118, 120, 128, and 132, respectively, in communication with fleet schedulers 108. Fleet scheduler 108 may include various task lists such as task list 122 and task list 124. Each task list may include different tasks to be assigned to a number of robots. In some cases, a collection of tasks may constitute a "job." In some cases, robots may perform different jobs with some subset of tasks therein being replicated among jobs and other tasks being specific to the job.

Fleet scheduler 108 may coordinate task assignments for multiple fleets of robots. For example, robot 102, robot 104, and robot 106 are part of a first fleet of robots and robot 126 and robot 130 are part of a second fleet of robots. Each robot may have one or more actuators having an associated usage amount (e.g., actuator 110 having a 50% usage amount, indicating that the actuator has consumed 50% of the available wear or duty cycles until maintenance or replacement is due). The usage amount of each actuator for each robot is communicated to fleet scheduler 108 which uses the data to determine the allocation of tasks to specific robots.

As an example, fleet scheduler 108 has or receives a first task list (e.g., task list 122 received via networked communication) comprising tasks 1-10 to be performed by any of robots 102, 104, and 106. Fleet scheduler 108 may use the information corresponding to the duty cycles of each task and the usage amounts of each actuator to determine a best fit assignment of the task. Fleet scheduler 108 may assign specific tasks based on each actuator's capabilities. Thus, fleet scheduler 108 assigns tasks 1, 4, and 8 having the least amount of duty cycles to robot 102. In another example, robot 106 is assigned tasks 6, 7, 9, and 10. Tasks 6, 7, and 9 may be effectuated by actuator 118 and task 10 may be effectuated by actuator 120 to promote even wear on the actuators of robot 106. In some embodiments, Fleet scheduler 108 may provide specific instructions on which task is to be performed by a specific actuator.

Task lists (e.g., task list 122) may be received via a networked communication (e.g., internet, Wi-Fi) or may be generated by fleet scheduler 108 itself. In some embodiments, a task list includes one or more tasks to be performed by a specific type of robot, at a specific location, at a specific time, or other detailed configuration pertaining to performance of the one or more tasks.

Each actuator in each robot may have differing capabilities, material makeup, components, lifecycles, and other conditions that vary its ability to perform certain tasks. In some embodiments, each robot has the same number of actuators, and each actuator has the same usage amount. In some embodiments, one or more robots of the fleet of robots includes varying numbers of actuators and each actuator having varying usage amounts. Usage amounts of actuators are understood to mean an approximate useful lifespan of an actuator. For example, an actuator having a useful life of 2000 duty cycles and having been used for 1500 of them may have a usage amount expressed in a percentage as 75%. Other metrics of actuator usage and condition are also contemplated, e.g., usage may be expressed as a probability of failure on a next duty cycle, where failure may include ceasing operation or operating outside of tolerance.

Each of the robots 102, 104, 106, 126, and 130 may be re-configured into different fleets. For example, for performance of tasks in task list 122, robots 102, 104, and 106 are configured into a fleet. After completion of the tasks in task list 122, each of the robots may be made available to a baseline or global fleet including robot 126 and 130 to await future fleet placements. In some examples, the robot fleets are configured to be static fleet configurations.

Figure 2:
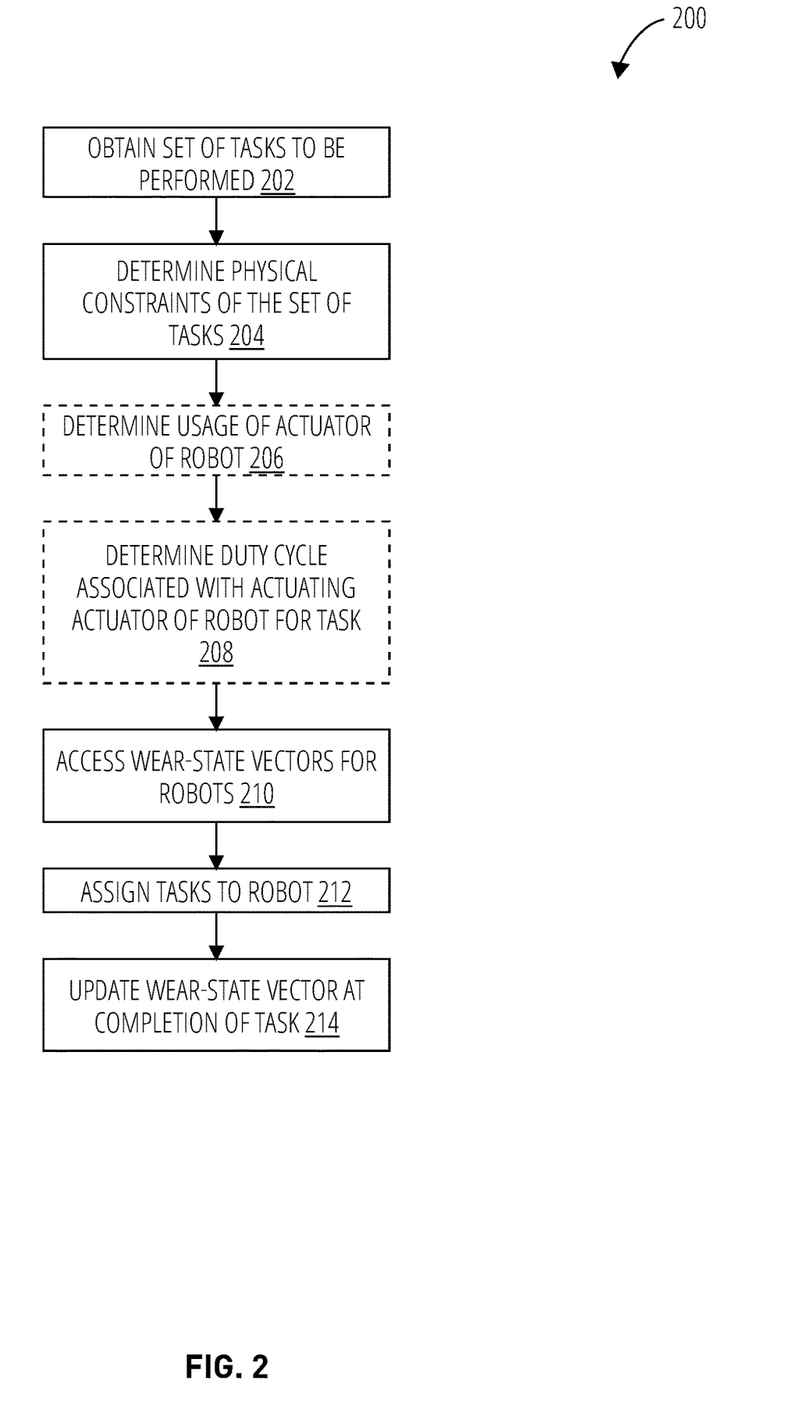
FIG. 2 illustrates an example flow diagram for a method involved in assigning tasks to robots in a fleet of robots in accordance with some embodiments.

FIG. 2 illustrates an example flow diagram for a method involved in assigning tasks to robots in a fleet of robots in accordance with some embodiments. Method 200 may be performed by a computer system (e.g., computer systems 502). In some embodiments, the computer system is geographically remote from robots or co-located with the robots.

Method 200 may be performed at a computer system obtains (202) a set of tasks to be performed by one or more robots of a fleet of robots. In some embodiments, the set of tasks includes multiple tasks that is to be performed by multiple robots. In some embodiments, the set of tasks includes multiple tasks that is to be performed by a single robot.

The computer system then determines (204) one or more physical constraints of the set of tasks. The physical constraints may include anticipated wear and tear on a servo, a motor, mechanical joint, etc., or by calculating an anticipated number of duty cycles to be performed in completion of the task. In some embodiments, the scheduler operates by consulting a cost table including a cost-per-wear approximated to each task. In some cases, the cost table is a version of a look-up table that maps the approximated cost-per-wear for each robot for each task. The cost table may be used in conjunction with any of the described vector packing In some embodiments, the scheduler splits a task into discrete sub-tasks. For example, a specified task includes retrieving a box, opening the box, and removing the contents within the box. However, the assigned robot may not have the capabilities of performing the full task. In such a situation, the scheduler is configured to assign a subtask of retrieving the box to a first robot, assigning a subtask for opening the box to a second robot, and/or assigning the subtask of removing the contents to either the first robot, the second robot, or even a third robot.

The computer system in some embodiments determines (206) a usage of an actuator of a first robot. In some embodiments, the computer system receives the usage of the actuator from a central location (e.g., server 408). In some embodiments, the computer system monitors the actual usage of each actuator for each robot in the fleet. As discussed with reference to FIG. 1, each actuator may have a corresponding usage indicator indicative of a remaining useful life of the actuator.

The computer system in some embodiments determines (208) a duty cycle associated with actuating the actuator of the first robot for completion of the task. In some embodiments, the duty cycle associated with actuating the actuator is an estimate. In some embodiments, the computer system receives and/or computes a precise duty cycle count associated with completion of the task.

The computer system access (210) wear-state vectors for each robot of the fleet of robots and assigns (212) the tasks to a robot for completion of the task based at least in part on the wear-state vector of the robot. A wear-state vector may increase monotonically in each dimension noted above as duty cycles occur with the actuator or other part corresponding to that dimension. In some cases, some or all dimensions of the wear state vector may be determined based on feedback, e.g., a motor current, loss of tolerance, or "slop" in a servo gear, etc., detected based on feedback from sensors of the robot. In some cases, a wear amount corresponding to such a dimension may be inferred from both such feedback and a number of duty cycles executed. In some cases, duty cycles are weighted based on dynamic stresses, the range of movement, or static stresses experienced by the corresponding component, e.g., quickly lifting something heavy may cause a higher weight to be applied that duty cycle than is applied to another duty cycle in which something light is slowly lifted. In some embodiments, the computer system updates (214) the wear-state vector of the robot at the completion of the assigned task. This updated wear-state vector may be stored in memory of the computer system and accessed for future task assignments. In some cases, dimensions of the wear state vector may be re-set, for instance to zero, upon replacement of the corresponding part or upon maintenance.

In some embodiments, the computer system uses any of the data from operations 202-212 to update one or more machine learning models.

It is contemplated that the actions or descriptions of FIG. 2 may be used with any other embodiment of this disclosure. In addition, the actions and descriptions described in relation to FIG. 2 may be performed in alternative orders or in parallel to further the purposes of this disclosure. For example, each of these actions may be performed in any order, in parallel, or simultaneously to reduce lag or increase the speed of the system or method, none of which is to suggest that any other description is limiting. Furthermore, it should be noted that any of the devices or equipment discussed in relation to FIGS. 1-5 could be used to perform one or more of the actions described in FIG. 2.

Figure 3:
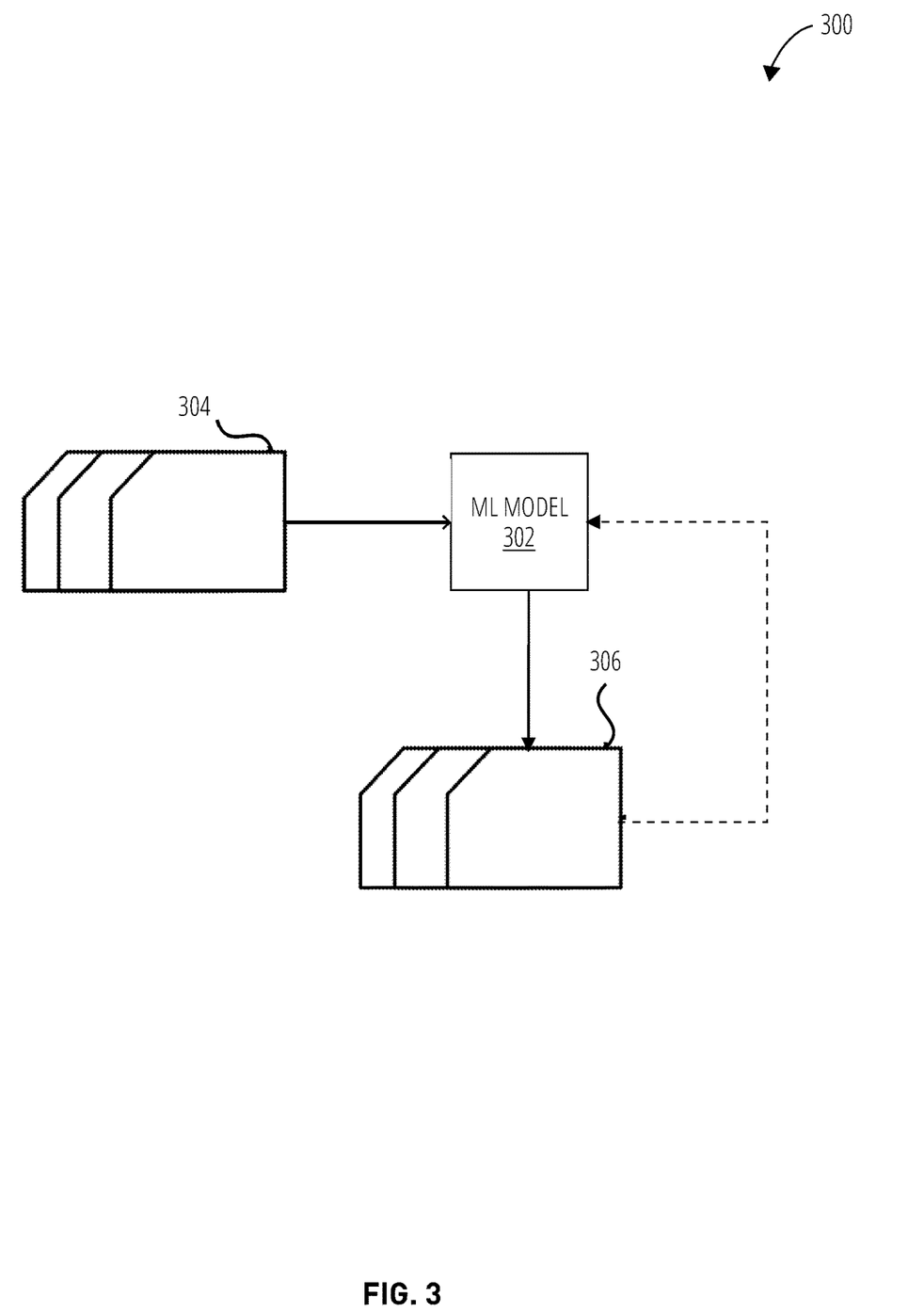
FIG. 3 illustrates an example machine learning system for assigning tasks to robots in a fleet of robots in accordance with some embodiments.

FIG. 3 illustrates an example machine learning model 300 by which scheduling may be implemented in accordance with some embodiments. Machine learning model 302 may take inputs 304 and provide outputs 306. In one use case, outputs 306 may be fed back to machine learning model 302 as inputs to train machine learning model 302 (e.g., alone or in conjunction with user indications of the accuracy of outputs 306, labels associated with the inputs, or with other reference feedback and/or performance metric information). In another use case, machine learning model 302 may update its configurations (e.g., weights, biases, or other parameters) based on its assessment of its prediction (e.g., outputs 306) and reference feedback information (e.g., user indication of accuracy, reference labels, or some other information). In another example use case, where machine learning model 302 is a neural network and connection weights may be adjusted to reconcile differences between the neural network's prediction and the reference feedback. In a further user case, one or more neurons (or nodes) of the neural network may require that their respective errors be sent backward through the neural network to them to facilitate the update process (e.g., backpropagation of error). Updates to the connection weights may, for example, be reflective of the magnitude of error propagated backward after a forward pass has been completed. In this way, for example, the machine learning model 302 may be trained to generate results (e.g., task completion time predictions, urgency levels, maintenance timelines, end-of-life predictions) with better recall, accuracy, and/or precision.

The machine learning model 302 may be structured as a factorization machine model. The machine learning model 302 may be a non-linear model and/or supervised learning model that can perform classification and/or regression. For example, the machine learning model 302 may be a general-purpose supervised learning algorithm that the system uses for both classification and regression tasks. Alternatively, the machine learning model 302 may include a Bayesian model configured to perform variational inference, for example, to predict whether an action will be completed by the deadline. The machine learning model 302 may be implemented as a decision tree and/or as an ensemble model (e.g., using random forest, bagging, adaptive booster, gradient boost, XGBoost, etc.).

Figure 4:
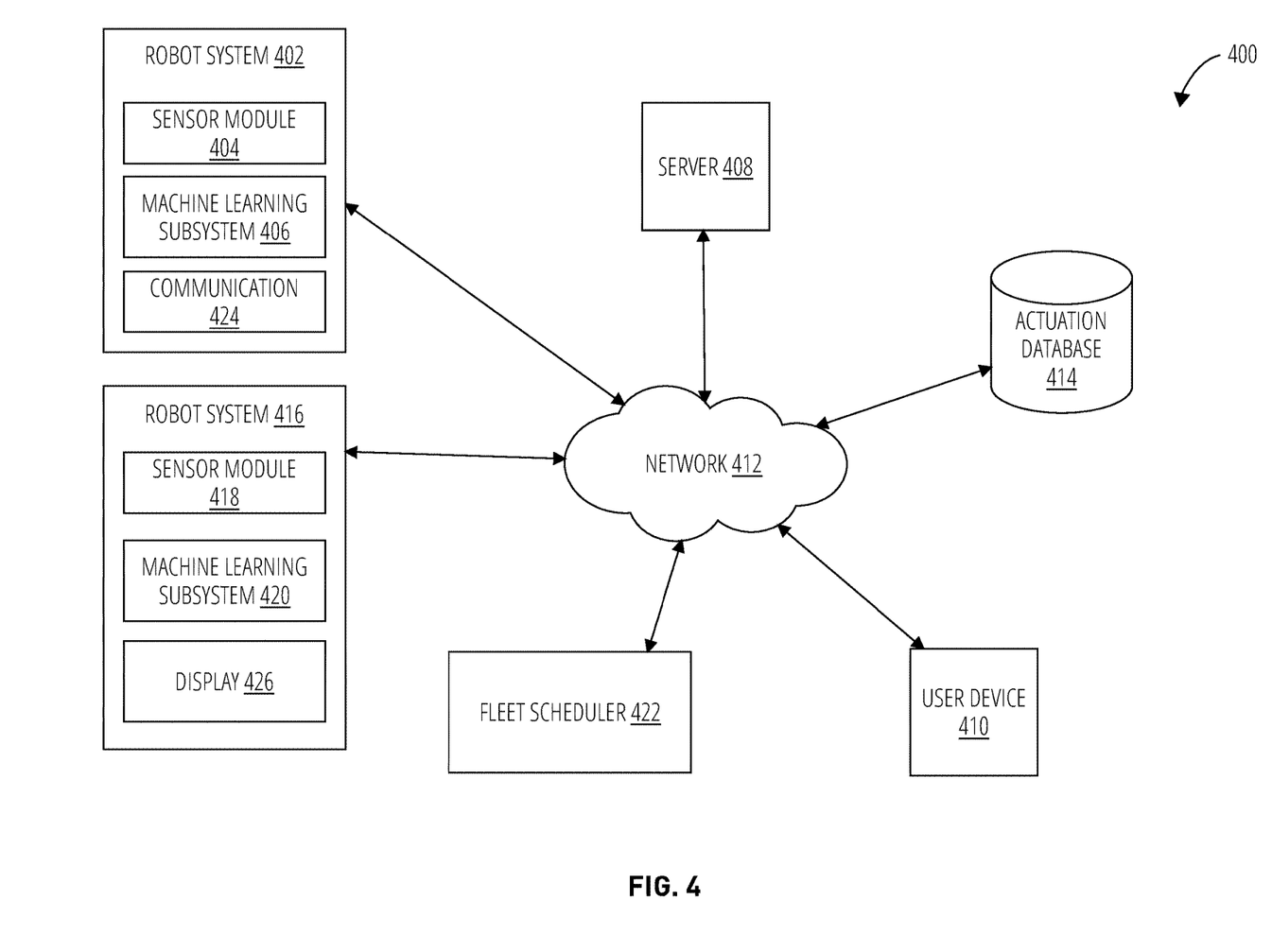
FIG. 4 illustrates an example block diagram of a networked system for assignment of tasks to a fleet of robots in accordance with some embodiments.

FIG. 4 illustrates an example computing system for assigning tasks to a fleet of robots in accordance with some embodiments. The computing system 400 may include a robot system 402 having sensor module 404, machine learning subsystem 406, communication subsystem 424, robot system 416 having sensor module 418, machine learning subsystem 420, display 426, fleet scheduler 422, a server 408, a user device 410, and actuation database 414. Each robot system (e.g., robot system 402) may include a sensor module 404, a machine learning subsystem 406, a communication subsystem 424, and others not shown.

Robot system 402 is an example of a robot that includes a sensor module 404, a machine learning subsystem 406, and a communication 424 module. Additional modules may be included but are not illustrated in FIG. 4. Robot system 402 may be modularly configurable, meaning, one or more modules may be added or removed from the robot system 402. Robot system 416 may be substantially the same robot as robot system 402.

Sensor module 404 of robot system 402 may include a plurality of sensors including temperature sensors, pressure sensors, cameras, inertial measurement units (IMUs), and other various configurable sensors. Each of the sensors may be configured to provide sensor data to an onboard computer system or transmitted via network 412 to one or more computing devices including server 408 and/or user device 410.

The machine learning subsystem 406 may include a plurality of machine learning models. For example, the machine learning subsystem 406 may pipeline an encoder and a reinforcement learning model that are collectively trained with end-to-end learning, the encoder being operative to transform relatively high-dimensional outputs of a robot's sensor suite into lower-dimensional vector representations of each time slice in a latent embedding space, and the reinforcement learning model being configured to update setpoints for robot actuators based on those vectors. Some embodiments of the machine learning subsystem 406 may include an encoder model, a dynamic model, an actor-critic model, a reward model, an anomaly detection model, or a variety of other machine learning models (e.g., any model described in connection with FIG. 3. One or more portions of the machine learning subsystem 406 may be implemented on the robot system 402, the server 408, or the fleet scheduler 422. Although shown as distinct objects in FIG. 4, functionality described below in connection with the robot system 402, the server 408, or the fleet scheduler 422 may be performed by any one of the robot systems, the server 408, or the fleet scheduler 422. The robot system 402, the server 408, or the fleet scheduler 422 may communicate with each other via the network 412.

The communication module 424 may be used by the robot system 402 to communicate with another robot system (e.g., robot system 416), server 408, fleet scheduler 422, user device 410, actuation database 414, or any other networked peripheral device.

The fleet scheduler 422 may receive, configure, and assign tasks to one or more robots in a fleet of robots in accordance with the details provided herein with respect to fleet scheduler 108 in FIG. 1.

Actuation database 414 may include a directory of tasks that the fleet of robots are able to handle. For example, actuation database 414 includes a list of various categories of tasks that a set robot can perform. Robot A may be able to pick up, carry, and deposit objects weighing up to 25 pounds, whereas Robot B may only be able to pick up, carry, and deposit objects weighing up to 5 pounds. The actuation database may include data pertaining to robot capabilities as well as historical information on performance of tasks (e.g., wear-state vectors for each actuator of each robot). Additional information may be stored at the actuation database including optimization algorithms, one or more machine learning models, training data, historical data, metadata, performance data, and cost-schedules.

The robot system 402 may obtain records generated from one or more user devices 410. User device 410 may be used as input devices from human operators instructing the robot to perform one or more tasks. For example, user A of user device 410 submits a request for performance of a set of tasks. The request may be routed through network 412, to actuation database 414, server 408, fleet scheduler 422, and/or robot system 402 or robot system 416 for performance of the set of tasks.

The robot system 402 may include one or more cameras that may be used to record the environment surrounding the robot system 402. The cameras may include one or more RGB cameras (e.g., with a complementary metal oxide semiconductor sensor), one or more infrared cameras, one or more depth sensing cameras or a variety of other cameras. In some cases, the cameras are arranged in stereoscopic arrays, and some embodiments use structured light, time-of-flight, or LIDAR to sense depth. The fleet scheduler 422 may output video or images obtained via cameras of the robot system 402 to a display 426 of the robot. The display 426 may include a virtual reality headset, an augmented reality display (e.g., augmented reality glasses), a screen, or a variety of other displays.

In some embodiments, robots implementing the present techniques may be trained and controlled with models like those described in a U.S. Pat. App. titled SPATIO-TEMPORAL CONSISTENCY EMBEDDINGS FROM MULTIPLE OBSERVED MODALITIES, assigned application Ser. No. 17/657,723, now U.S. Pat. No. 11,636,398.

In some embodiments, robots implementing the presents techniques may be trained and controlled with models like those described in a U.S. Pat. App. titled HYBRID COMPUTING ARCHITECTURES WITH SPECIALIZED PROCESSORS TO ENCODE/DECODE LATENT REPRESENTATIONS FOR CONTROLLING DYNAMIC MECHANICAL SYSTEMS, assigned application Ser. No. 17/711,960, now U.S. Pat. No. 11,478,927.

In some embodiments, robots implementing the present techniques may be administered with systems like those described in a U.S. Pat. App. titled SYSTEM FOR PRESENTING ROBOTIC DATA FLOWS FOR APPLICATION DEVELOPMENT, assigned application Ser. No. 17/711,973.

In some embodiments, robots implementing the present techniques may have touch sensors like those described in a U.S. Pat. App. titled COMBINED ANALOG AND DIGITAL ARCHITECTURE FOR HANDLING SENSORY INPUT DATA, assigned application Ser. No. 17/711,983, now U.S. Pat. No. 11,625,122.

In some embodiments, fleets of robots implementing the present techniques may be managed with systems like those described in a U.S. Pat. App. titled CONFIGURING AND MANAGING FLEETS OF DYNAMIC MECHANICAL SYSTEMS, assigned application Ser. No. 17/711,991.

Figure 5:
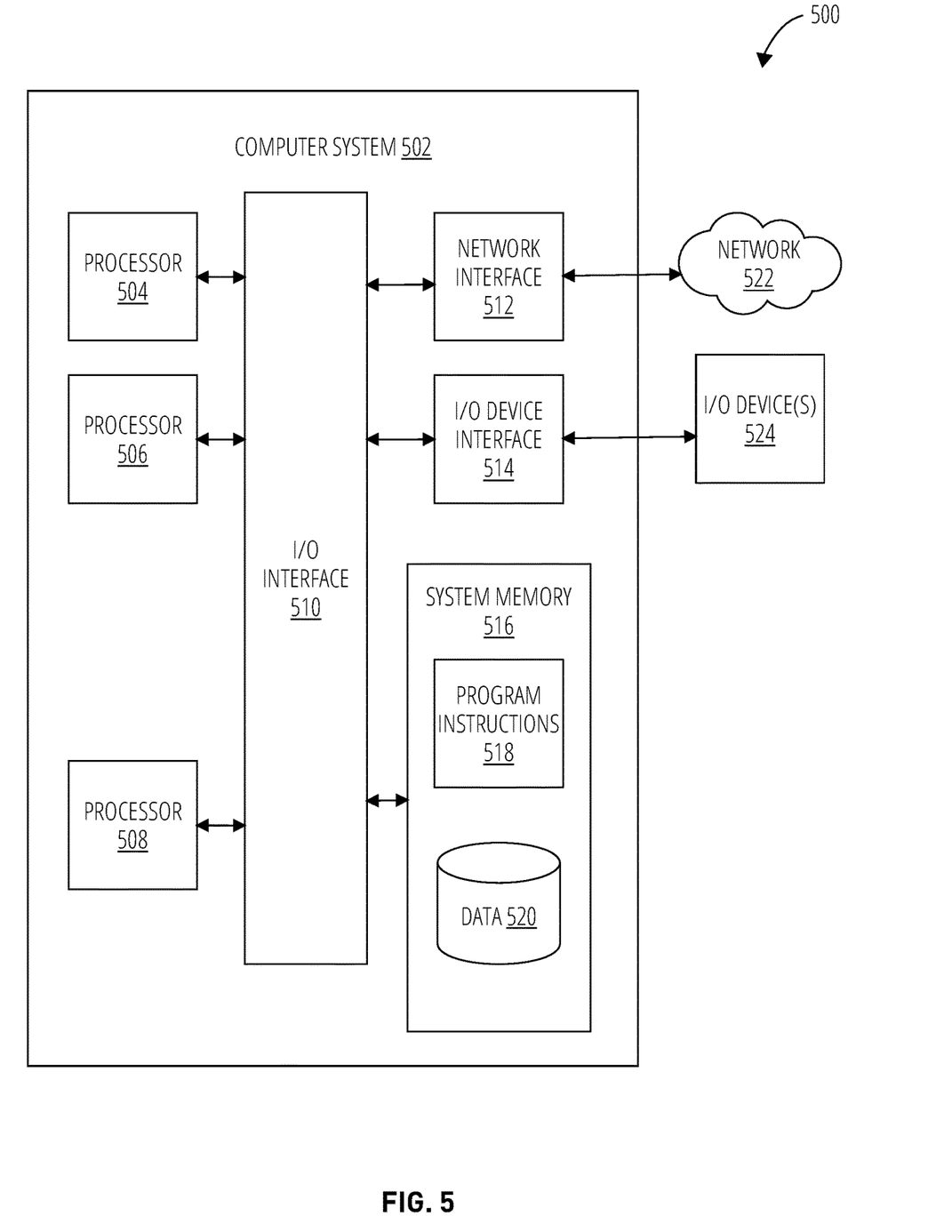
FIG. 5 illustrates an example block diagram of a computing system for assignment of tasks to robots in a fleet of robots in accordance with some embodiments.

FIG. 5 is a diagram that illustrates an exemplary computing system 500 in accordance with embodiments of the present technique. Various portions of systems and methods described herein, may include or be executed on one or more computer systems similar to computing system 500. Further, processes and modules described herein may be executed by one or more processing systems like that of computing system 500.

Computer system 502 may include one or more processors (e.g., processors 504-508) coupled to system memory 516, an input/output I/O device interface 514, and a network interface 512 via an input/output (I/O) interface 510. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computer system 502. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 516). Computer system 502 may be a units-processor system including one processor (e.g., processor 504), or a multi-processor system including any number of suitable processors (e.g., 504-508). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computer system 502 may include a plurality of computing devices (e.g., distributed computer systems) to implement various processing functions.

I/O device interface 514 may provide an interface for connection of one or more I/O devices 524 to computer system 502. I/O devices may include devices that receive input (e.g., from a user) or output information (e.g., to a user). I/O devices 524 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 560 may be connected or communicably coupled with computer system 502 through a wired or wireless connection. I/O devices 524 may be connected to computer system 502 from a remote location. I/O device(s) 524 located on remote computer system, for example, may be connected or communicably coupled with computer system 502 via a network 522 and network interface 512.

Network interface 512 may include a network adapter that provides for connection of computer system 502 to a network 522. Network interface 512 may facilitate data exchange between computer system 502 and other devices connected to the network. Network interface 512 may support wired or wireless communication. The network may include an electronic communication network, such as the Internet, a local area network (LAN), a wide area network (WAN), a cellular communications network, or the like.

System memory 516 may be configured to store program instructions 518 or data 520. Program instructions 518 may be executable by a processor (e.g., one or more of processors 504-508) to implement one or more embodiments of the present techniques. Instructions 518 may include modules of computer program instructions for implementing one or more techniques described herein regarding various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 516 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random-access memory (SRAM), synchronous dynamic RAM (SDRAM)), bulk storage memory (e.g., CD-ROM and/or DVD-ROM, hard drives), or the like. System memory 516 may include a non-transitory computer readable storage medium that may have program instructions stored thereon that are executable by a computer processor (e.g., one or more of processors 504-508) to cause the subject matter and the functional operations described herein. A memory (e.g., system memory 516) may include a single memory device and/or a plurality of memory devices (e.g., distributed memory devices).

I/O interface 510 may be configured to coordinate I/O traffic between processors 504-508, system memory 516, network interface 512, I/O devices 524, and/or other peripheral devices. I/O interface 510 may perform protocol, timing, or other data transformations to convert data signals from one component (e.g., system memory 516) into a format suitable for use by another component (e.g., processors 504-508). I/O interface 510 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 502 or multiple computing systems 500 configured to host different portions or instances of embodiments. Multiple computing systems 500 may provide for parallel or sequential processing/execution of one or more portions of the techniques described herein.

Those skilled in the art will appreciate that computing system 500 is merely illustrative and is not intended to limit the scope of the techniques described herein. Computing system 500 may include any combination of devices or software that may perform or otherwise provide for the performance of the techniques described herein. For example, computing system 500 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 500 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all the software components may execute in memory on another device and communicate with the illustrated computer system via inter-computer communication. Some or all the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 500 may be transmitted to computing system 500 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present disclosure may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine readable medium. In some cases, third party content delivery networks may host some or all the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

The description is not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "an element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

Examples for assigning tasks to a fleet of robots include those consistent with the following enumerated embodiments:

1. A non-transitory, computer-readable medium storing instructions that when executed effectuate operations comprising: obtaining, with a computer system, a set of tasks to be performed by a fleet of robots; obtaining, with the computer system, for each task in the set of tasks, a respective plurality of duty cycles, each corresponding to an amount of usage of a respective actuator of a robot among the fleet of robots upon performing the respective task; accessing, with the computer system, for each robot in the fleet of robots, a current wear-state vector having dimensions corresponding to cumulative wear on actuators of the respective robots; and based on the current wear-state vectors and the duty cycles of the tasks, with the computer system, assigning the tasks to the robots in the fleet of robots.
2. The medium of embodiment 1, wherein assigning the tasks to the robots in the fleet of robots comprises: determining an assignment of the tasks that brings maintenance on the robots closer into being synchronized than other candidate assignments of the tasks among the robots.
3. The medium of embodiment 1, wherein assigning the tasks to the robots in the fleet of robots comprises: determining that a given one of the tasks will cause wear on a robot component among a plurality of components of the robots; determining that a first instance of the robot component on a first robot among the fleet has a first amount of usage remaining before failure or maintenance; determining that a second instance of the robot component on a second robot among the fleet has a second amount of usage remaining before failure or maintenance; and determining that the first amount is greater than the second amount and, in response, assigning the task to the first robot.
4. The medium of embodiment 1, wherein: each robot in the fleet of robots has more than 15 components that wear during usage; the fleet of robots comprises more than 5 robots; the tasks comprise more than 5 tasks that are different from one another and cause different amounts of wear on the more than 15 components; and at least some of the robots in the fleet of robots have different amounts of wear from one another.
5. The medium of embodiment 4, wherein assigning the tasks to the robots in the fleet of robots comprises: determining assignments based on how evenly resulting wear on more than 15 components on the more than 5 robots will be after performing the tasks.
6. The medium of embodiment 4, wherein: at least some of the more than 5 tasks are not obtained before others of the more than 5 tasks are assigned to the robots in the fleet of robots.
7. The medium of embodiment 6, wherein: assigning the at least some of the more than 5 tasks comprises predicting likelihood of the others of the more than 5 tasks and determining likelihood-weighted wear amounts on the more than 15 components; and assignments are based on both wear from the at least some of the more than 5 tasks and the likelihood-weighted wear amounts on the more than 15 components.
8. The medium of embodiment 1, wherein: each of the robots has a plurality of components that wear during operation; and assigning the tasks to the robots in the fleet of robots comprises: for each of the tasks, determining a respective hyperrectangle volume of a wear space, wherein dimensions of the wear space correspond to wear on corresponding components among the plurality of components imparted by respective task; and determining assignments of the tasks that minimizes amount of the wear space unoccupied by the hyperrectangle volumes of the task without exceeding a wear envelope, the wear envelope indicating the amount of wear in each dimension at which the corresponding component is expected to fail or undergoes maintenance.
9. The medium of embodiment 8, wherein: minimizing comprises determining a global minimum among all possible assignments of tasks.
10. The medium of embodiment 8, wherein: minimizing comprises determining at least a local minimum among all possible assignments of tasks.
11. The medium of embodiment 8, wherein: assignments for more than 5 tasks are determined on a task-by-task basis with a greedy optimization.
12. The medium of embodiment 8, wherein: assignments are determined on a task-by-task basis with a greedy optimization.
13. The medium of embodiment 8, wherein: assignments are determined collectively for more than 10 of the tasks to collectively minimize the amount of the wear space unoccupied by the hyperrectangle volumes attributable to the more than 10 of the tasks.
14. The medium of any one of embodiments 1-13, wherein accessing the current wear-state vector comprises inferring at least some dimensions of the current wear state vector based on feedback from a corresponding robot among the fleet of robots.
15. The medium of embodiment 14, wherein the feedback comprises oscillations indicative of wear on a gear of an actuator.
16. The medium of embodiment 14, wherein the feedback comprises a voltage or current measurement indicative of torque applied by a motor while performing a previous task.
17. A method, comprising: the operations of any one of embodiments 1-16.
18. A system, comprising: the medium of any one of embodiments 1-16 and a fleet of robots.

What is claimed is:

1. A non-transitory, computer-readable medium storing instructions that when executed effectuate operations comprising:
   obtaining, with a computer system, a set of tasks to be performed by a fleet of robots;
   obtaining, with the computer system, for each task in the set of tasks, a respective plurality of duty cycles, each corresponding to an amount of usage of a respective actuator of a robot among the fleet of robots upon performing the respective task;

accessing, with the computer system, for each robot in the fleet of robots, a current wear-state vector having dimensions corresponding to cumulative wear on actuators of the respective robots; and based on the current wear-state vectors and the duty cycles of the tasks, with the computer system, assigning the tasks to the robots in the fleet of robots.

2. The medium of claim 1, wherein assigning the tasks to the robots in the fleet of robots comprises:

determining an assignment of the tasks that brings maintenance on the robots closer into being synchronized than other candidate assignments of the tasks among the robots.

3. The medium of claim 1, wherein assigning the tasks to the robots in the fleet of robots comprises:

determining that a given one of the tasks will cause wear on a robot component among a plurality of components of the robots;

determining that a first instance of the robot component on a first robot among the fleet has a first amount of usage remaining before failure or maintenance;

determining that a second instance of the robot component on a second robot among the fleet has a second amount of usage remaining before failure or maintenance; and determining that the first amount is greater than the second amount and, in response, assigning the task to the first robot.

4. The medium of claim 1, wherein:

each robot in the fleet of robots has more than 15 components that wear during usage;

the fleet of robots comprises more than 5 robots;

the tasks comprise more than 5 tasks that are different from one another and cause different amounts of wear on the more than 15 components; and at least some of the robots in the fleet of robots have different amounts of wear from one another.

5. The medium of claim 4, wherein assigning the tasks to the robots in the fleet of robots comprises:

determining assignments based on how evenly resulting wear on more than 15 components on the more than 5 robots will be after performing the tasks.

6. The medium of claim 4, wherein:

at least some of the more than 5 tasks are not obtained before others of the more than 5 tasks are assigned to the robots in the fleet of robots.

7. The medium of claim 6, wherein:

assigning the at least some of the more than 5 tasks comprises predicting likelihood of the others of the more than 5 tasks and determining likelihood-weighted wear amounts on the more than 15 components; and assignments are based on both wear from the at least some of the more than 5 tasks and the likelihood-weighted wear amounts on the more than 15 components.

8. The medium of claim 1, wherein:

each of the robots has a plurality of components that wear during operation; and assigning the tasks to the robots in the fleet of robots comprises:

for each of the tasks, determining a respective hyperrectangle volume of a wear space, wherein dimensions of the wear space correspond to wear on corresponding components among the plurality of components imparted by respective task; and determining assignments of the tasks that minimizes amount of the wear space unoccupied by the hyperrectangle volumes of the task without exceeding a wear envelope, the wear envelope indicating the amount of wear in each dimension at which the corresponding component is expected to fail or undergoes maintenance.

9. The medium of claim 8, wherein:

minimizing comprises determining a global minimum among all possible assignments of tasks.

10. The medium of claim 8, wherein:

minimizing comprises determining at least a local minimum among all possible assignments of tasks.

11. The medium of claim 8, wherein:

assignments for more than 5 tasks are determined on a task-by-task basis with a greedy optimization.

12. The medium of claim 8, wherein:

assignments are determined on a task-by-task basis with a greedy optimization.

13. The medium of claim 8, wherein:

assignments are determined collectively for more than 10 of the tasks to collectively minimize the amount of the wear space unoccupied by the hyperrectangle volumes attributable to the more than 10 of the tasks.

14. The medium of claim 1, wherein accessing the current wear-state vector comprises inferring at least some dimensions of the current wear state vector based on feedback from a corresponding robot among the fleet of robots.

15. The medium of claim 14, wherein the feedback comprises oscillations indicative of wear on a gear of an actuator.

16. The medium of claim 14, wherein the feedback comprises a voltage or current measurement indicative of torque applied by a motor while performing a previous task.

17. The medium of claim 1, wherein the assignments are determined with steps for online bin packing.

18. The medium of claim 1, wherein the assignments are determined with steps for offline bin packing.

19. The medium of claim 1, the operations comprising performing the tasks with the robots in the fleet.

20. A method, comprising:

obtaining, with a computer system, a set of tasks to be performed by a fleet of robots;

obtaining, with the computer system, for each task in the set of tasks, a respective plurality of duty cycles, each corresponding to an amount of usage of a respective actuator of a robot among the fleet of robots upon performing the respective task;

accessing, with the computer system, for each robot in the fleet of robots, a current wear-state vector having dimensions corresponding to cumulative wear on actuators of the respective robots; and based on the current wear-state vectors and the duty cycles of the tasks, with the computer system, assigning the tasks to the robots in the fleet of robots.

\* \* \* \* \*